June 16, 1931.  O. A. PEARSON  1,809,864
INSULATING BUSHING
Filed July 30, 1928
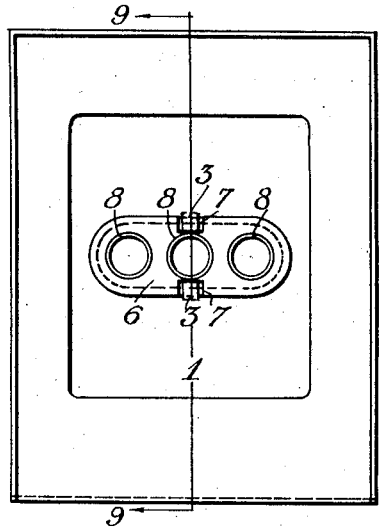
Fig. 1.
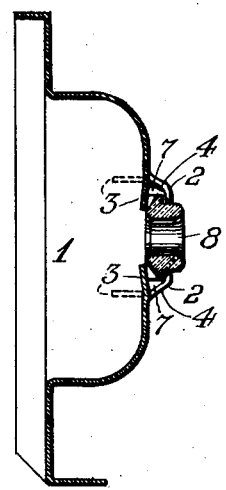
Fig. 2.
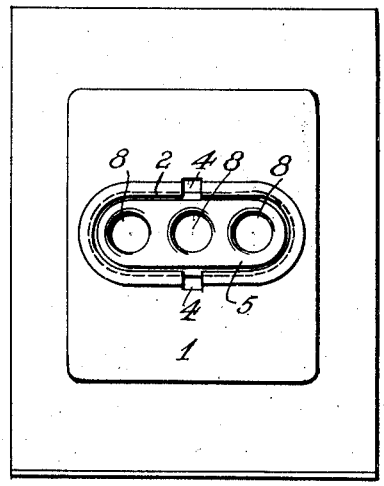
Fig. 4.
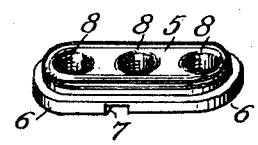
Fig. 3.
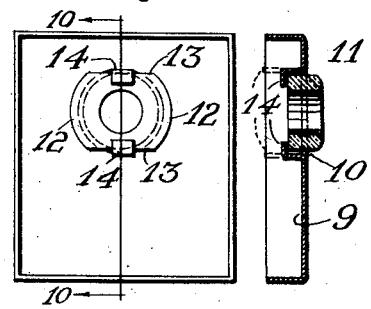 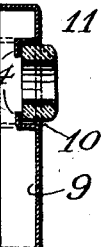
Fig. 5.  Fig. 6.
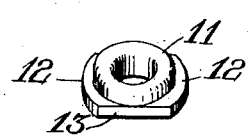
Fig. 7.
INVENTOR.
Oscar A. Pearson
BY Brayton Richards
ATTORNEY.

Patented June 16, 1931

1,809,864

UNITED STATES PATENT OFFICE

OSCAR A. PEARSON, OF OAK PARK, ILLINOIS, ASSIGNOR TO THORDARSON ELECTRIC MANUFACTURING COMPANY, OF CHICAGO, ILLINOIS, A CORPORATION OF ILLINOIS

INSULATING BUSHING

Application filed July 30, 1928. Serial No. 296,253.

The invention relates to an improved insulating bushing especially adapted for use in conjunction with metal casings or boxes for containing electrical appliances, the primary object of the invention being to provide a bushing of this character adapted and arranged to protect openings in such boxes or casings for the passage of insulated electric wires and which is of simple construction, capable of economical production and highly efficient in use.

Another object of the invention is to provide an improved bushing of this character and associated features of a wall of a metallic casing or box for securing the bushing in place.

Other objects will appear hereinafter.

The invention consists in the combinations and arrangements of parts hereinafter described and claimed.

The invention will be best understood by reference to the accompanying drawings forming a part of this specification and in which—

Fig. 1 is an interior view of the cover of a metallic casing or box equipped with a bushing embodying the invention;

Fig. 2, a section thereof taken substantially on line 9—9 of Fig. 1;

Fig. 3, a perspective view of the bushing removed;

Fig. 4, an exterior elevation corresponding with Fig. 1;

Fig. 5, a view similar to Fig. 1, but showing a modified form of construction;

Fig. 6, a section taken substantially on line 10—10 of Fig. 5; and

Fig. 7, a perspective view of the modified form of bushing illustrated in Figs. 5 and 6.

The form of construction illustrated in Figs. 1, 2, 3 and 4 comprises a cover member 1 adapted and arranged to constitute the top wall of a metal casing or box for containing electrical appliances.

The member 1 is formed, as shown, of pliable sheet metal and provided centrally with a raised oblong boss 2, having an oblong opening therein, as shown.

Pliable metal securing tangs 3 are struck, as shown, from opposite sides of the boss 2 and bent inwardly, as indicated by the dotted lines in Fig. 2, the removal of said tangs forming notches 4 in the sides of the boss 2.

Associated with the boss 2 is a bushing member 5 formed of porcelain or the like, and oblong in shape, to fit through the opening in the boss 2. The bushing 5 is provided at its inner end with an enlarged head 6 fitting within the boss 2 and preventing complete passage of the bushing through the opening.

Notches 7 are provided in opposite sides of the head 6 for the reception of the tangs 3, when said tangs are bent into full line position shown in Fig. 2.

The body of the bushing 5 is provided with a plurality of openings 8 for the passage of wires into the interior of the casing or box.

In practice, the cover member 1 is formed of sheet metal, preferably a stamping, with the tangs 3 extending straight inwardly, as indicated by the dotted lines in Fig. 2. The bushings are separately formed and inserted, as indicated, with the body of the bushing projecting through the opening in the boss 2 and the head 6 fitting within said boss. Then the tangs 3 are bent outwardly to engage the notches 7, as indicated by the full lines in Fig. 2. This will secure the bushing in place in the opening, as will be readily understood.

By this arrangement, a bushing is provided permitting the passage of a plurality of insulated wires into the interior of the casing or box, of which the member 1 constitutes the cover. Obviously, the bushings thus provided and their associated parts may be manufactured economically, readily applied, and are highly efficient in use.

The modified form of construction illustrated in Figs. 5, 6 and 7 comprises a cover member 9 having a circular opening 10 therein, and a cylindrical bushing 11 is provided to fit through said opening. The bushing 11 is provided with an enlarged head 12 adapted to fit against the inner side of the wall of the cover member 9, the oppoiste sides of the head 12 being flattened at 13, as shown.

Pliable tangs 14 are struck inwardly from the metal removed in forming the opening 10 and serve as shown, as a means for securing the bushing in place.

In placing the bushing in position in the opening 10, the flattened sides 13 are brought opposite the tangs 14 and then the tangs are bent over the inner side of the head 12 as shown, thus firmly securing the bushing in place and preventing turning of the bushing in the circular opening 10. This constitutes a simple and effective bushing for use in circular openings.

It is also to be noted that by forming the tangs 14 from the metal removed in forming the opening 10, the formation of openings or notches in the member 9 is avoided.

While I have illustrated and described the preferred form of construction for carrying my invention into effect, this is capable of variation and modification without departing from the spirit of the invention. I, therefore, do not wish to be limited to the precise details set forth, but desire to avail myself of such variations and modifications as fall within the scope of the appended claims.

I claim:

1. The combination with a metal wall having an opening therein, of a bushing of insulating material fitting through said opening and provided with projections having notches on its inner face and at its outer face engaging said wall to prevent complete passage of said bushing; and one or more pliable tangs struck from and integral with said wall and bendable to engage said bushing at said notches to prevent withdrawal of said bushing from said opening.

2. The combination with a metal wall having an opening therein, of a bushing of insulating material projecting outwardly through said opening and provided at its inner end with an enlarged head having notches on its inner face and at its outer face fitting against the inner side of said wall to prevent complete passage of said bushing; and one or more pliable tangs struck from and integral with said wall and bendable to engage said head at the notches on said bushing head to prevent withdrawal of said bushing from said opening.

3. The combination with a metal wall having a boss struck up therefrom, said boss being provided with an opening; of a bushing of insulating material fitting through said opening and provided with a head seating against the inner surface of said boss and fitting therewithin; and one or more pliable tangs struck from said wall and bendable to engage said head to prevent withdrawal of said bushing from said boss and opening therein.

4. The combination with a metal wall having an oblong boss struck up therefrom, said boss being provided with an oblong opening, of an oblong bushing of insulating material fitting through said opening and provided with a head seating against the inner surface of said boss and fitting therewithin, there being notches in the sides of said head and a plurality of wire openings extending through the body of said bushing; and pliable tangs struck from said wall and bendable to engage said notches to prevent withdrawal of said bushing from said opening and boss.

In witness that I claim the foregoing as my invention, I affix my signature this 27th day of July, A. D. 1928.

OSCAR A. PEARSON.